(12) United States Patent
Kaihara et al.

(10) Patent No.: US 7,719,612 B2
(45) Date of Patent: May 18, 2010

(54) IMAGE PICKUP APPARATUS WITH FOREIGN OBJECT REMOVAL CAPABILITIES

(75) Inventors: Shoji Kaihara, Yokohama (JP); Hiroshi Yoshii, Yokohama (JP); Eiri Tsukatani, Shinagawa-ku (JP); Hirokazu Ichiki, Hachioji (JP); Futoshi Hirai, Kawasaki (JP); Toshifumi Urakami, Yokohama (JP); Hideaki Yamamoto, Kawasaki (JP); Yuuki Niwamae, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 586 days.

(21) Appl. No.: 11/356,583

(22) Filed: Feb. 17, 2006

(65) Prior Publication Data

US 2007/0103554 A1    May 10, 2007

(30) Foreign Application Priority Data

Nov. 7, 2005    (JP)    ............................. 2005-322375

(51) Int. Cl.
    *H04N 5/225*    (2006.01)
(52) U.S. Cl. .................................... 348/374; 348/208.7
(58) Field of Classification Search ................. 348/335, 348/205, 199, 203, 204, 208.11, 207.99, 348/368, 373, 341, 342, 374
    See application file for complete search history.

(56) References Cited

U.S. PATENT DOCUMENTS

| 5,805,212 | A | * | 9/1998 | Fujiwara | 348/208.8 |
|---|---|---|---|---|---|
| 5,926,656 | A | * | 7/1999 | Imura et al. | 396/55 |
| 5,940,642 | A |   | 8/1999 | Ishiguro |  |
| 6,016,221 | A | * | 1/2000 | Kaneda et al. | 359/557 |
| 6,047,133 | A | * | 4/2000 | Washisu et al. | 396/55 |
| 6,072,525 | A | * | 6/2000 | Kaneda | 348/208.15 |
| 6,208,377 | B1 | * | 3/2001 | Morofuji et al. | 348/208.8 |
| 6,522,837 | B2 | * | 2/2003 | Izukawa | 396/55 |
| 6,539,174 | B1 | * | 3/2003 | Tanii et al. | 396/55 |
| 6,583,819 | B2 |   | 6/2003 | Ito et al. |  |
| 6,734,901 | B1 | * | 5/2004 | Kudo et al. | 348/208.4 |
| 6,747,691 | B1 | * | 6/2004 | Satoh et al. | 348/208.5 |
| 6,940,542 | B2 | * | 9/2005 | Kitazawa et al. | 348/208.99 |
| 7,006,138 | B2 | * | 2/2006 | Kawai | 348/340 |
| 7,057,818 | B2 | * | 6/2006 | Hamano et al. | 359/557 |
| 7,161,621 | B2 | * | 1/2007 | Kai et al. | 348/208.11 |
| 7,245,361 | B2 | * | 7/2007 | Yamaguchi et al. | 356/124 |
| 7,324,148 | B2 | * | 1/2008 | Takizawa et al. | 348/340 |
| 7,460,155 | B2 | * | 12/2008 | Eto et al. | 348/208.99 |
| 7,466,910 | B2 | * | 12/2008 | Akada et al. | 396/55 |
| 2002/0054283 | A1 | * | 5/2002 | Kato et al. | 355/55 |
| 2002/0112543 | A1 | * | 8/2002 | Noguchi | 73/618 |
| 2003/0202114 | A1 |   | 10/2003 | Takizawa |  |

(Continued)

FOREIGN PATENT DOCUMENTS

EP    1564987 A    8/2005

(Continued)

*Primary Examiner*—Tuan Ho
*Assistant Examiner*—Don Nguyen
(74) *Attorney, Agent, or Firm*—Canon U.S.A., Inc. I.P. Division

(57) ABSTRACT

At least one exemplary embodiment is directed to an image pickup apparatus which includes an optical member that is vibrated in a direction substantially perpendicular to an optical axis to facilitate removal of particles (e.g., dust), where the vibration of the optical member is substantially isolated from an image pickup element.

8 Claims, 8 Drawing Sheets

U.S. PATENT DOCUMENTS

| | | | |
|---|---|---|---|
| 2004/0012714 A1* | 1/2004 | Kawai | 348/374 |
| 2004/0090549 A1 | 5/2004 | Takizawa et al. | |
| 2004/0227837 A1* | 11/2004 | Ito | 348/335 |
| 2004/0227845 A1* | 11/2004 | Kawai | 348/360 |
| 2005/0205117 A1* | 9/2005 | Mandai et al. | 134/34 |
| 2005/0206735 A1* | 9/2005 | Seo | 348/208.4 |
| 2005/0259156 A1* | 11/2005 | Kosaka et al. | 348/208.7 |
| 2006/0033818 A1* | 2/2006 | Wada et al. | 348/208.11 |
| 2006/0227437 A1* | 10/2006 | Makii | 359/824 |

FOREIGN PATENT DOCUMENTS

| | | |
|---|---|---|
| JP | 07-023286 A | 1/1995 |
| JP | 08-079633 A | 3/1996 |
| JP | 2002-010137 A | 1/2002 |
| JP | 2003-319222 A | 11/2003 |
| JP | 2004-133333 A | 4/2004 |
| JP | 2005-159711 A | 6/2005 |
| JP | 2006203776 A * | 8/2006 |

* cited by examiner

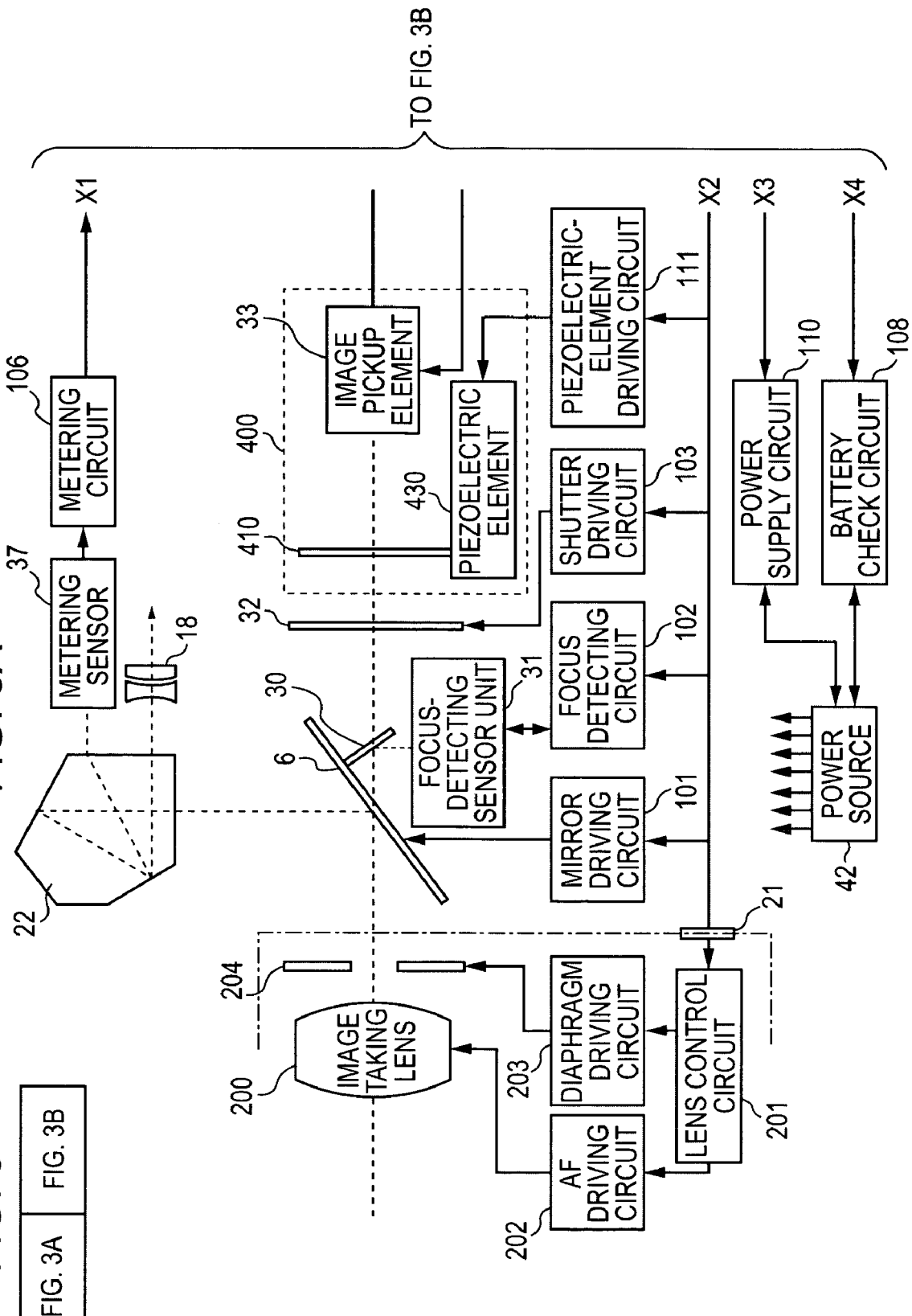

IMAGE PICKUP APPARATUS WITH FOREIGN OBJECT REMOVAL CAPABILITIES

BACKGROUND OF THE INVENTION

1. Field of the Invention

The present invention relates to an image pickup apparatus and, in particular though not exclusively, to a technique of removing a foreign object from an optical member.

2. Description of the Related Art

An image pickup apparatus that performs imaging by converting an image signal into an electrical signal, such as a digital camera, receives light with an image pickup element (e.g., a charge coupled device (CCD), a complementary metal oxide semiconductor (CMOS) device), converts a photoelectric conversion signal output from the image pickup element into image data, and records the image data on a recording medium (e.g., a memory card). In such an image pickup apparatus, an optical low-pass filter or an infrared cut filter is arranged adjacent to a subject with respect to the image pickup element, and when a foreign object (e.g., dust), adheres to a surface of the filter or a cover glass of the image pickup element, the adhering portion is present in a taken image as a black spot. This results in a degraded appearance of the image.

In particular, for a digital single-lens reflex camera with an interchangeable lens, since mechanical operational units, including a shutter, and a quick return mirror, are arranged adjacent to an image pickup element, a foreign object (e.g., dust), produced from the operational units can adhere to the image pickup element or a low-pass filter. Additionally, while the lens is interchanged, dust or other objects can enter a camera body from an opening of a lens mount and adhere to the camera components.

One approach to address this problem that has been suggested is to remove a foreign object (e.g., dust), on a surface of a dustproof curtain that allows a light beam for image taking to pass therethrough arranged adjacent to a subject with respect to the image pickup element by vibrating the dustproof curtain with a piezoelectric element, as discussed in Japanese Patent Laid-Open No. 2003-319222.

According to the technique discussed in this patent document, in order to remove a foreign object on the surface of the dustproof curtain, the dustproof curtain is vibrated by being displaced along the optical axis by the application of a drive voltage to a piezoelectric element connected to the dustproof curtain. However, in order to remove the foreign object from the dustproof curtain, it is necessary to shake the foreign object off the dustproof curtain by application of a force larger than adhesion of the foreign object in the optical axis, and as a result, a large amount of energy is required.

Additionally, according to the above technique, since the dustproof curtain is vibrated by being displaced along the optical axis, if the shape of the dustproof curtain is not circular, it is known that the vibration mode is complicated and vibration efficiency is decreased.

However, an effective imaging area of an image pickup apparatus generally has a rectangular shape with an aspect ratio of 4:3 or 3:2, and therefore, the shape of an effective light beam is rectangular in cross section. In order to allow the effective light beam having a rectangular shape to appropriately pass therethrough, the circular dustproof curtain is large with respect to the effective light beam. Therefore, arranging the circular dustproof curtain within the image pickup apparatus is unfavorable in terms of layout. This produces problems, such as an increase in the size of the image pickup apparatus, an inefficient layout therein.

At the same time, since the above technique requires a special component (namely the dustproof curtain) arranged in the optical axis for image taking, transmittance of the light beam for image taking is reduced, and as a result, the technique is unfavorable in terms of optical function or optical performance, in addition to inefficiency in layout.

Furthermore, a large amount of electric power is necessary for vibration of the dustproof curtain, which has a large size with respect to the effective light beams.

SUMMARY OF THE INVENTION

At least one exemplary embodiment is directed to an image pickup apparatus capable of removing a foreign object (e.g., dust), on an optical member arranged in the optical axis for image taking in an efficient manner with a small amount of electric power.

At least one exemplary embodiment is directed to an image pickup apparatus including an image pickup element configured to convert an optical image of a subject into an electric signal, an optical member configured to modulate an incident light beam into a predetermined light beam and output the predetermined light beam, the optical member having a substantially rectangular shape and being disposed in front of the image pickup element along an optical axis for image taking, a vibrating unit configured to provide vibration to the optical member in a direction substantially perpendicular to the optical axis for image taking, an elastic supporting member configured to support the optical member with respect to the image pickup element so as to facilitate the oscillation of the optical member, and a control unit configured to control the vibration provided by the vibrating unit.

Other features of the present invention will be apparent from the following description taken in conjunction with the accompanying drawings, in which like reference characters designate the same or similar parts throughout the figures thereof.

BRIEF DESCRIPTION OF THE DRAWINGS

The invention will now be described, by way of example, with reference to the accompanying schematic drawings, in which:

FIG. 3, i.e., FIGS. 3A-3B are block diagrams of an electrical structure of the digital single-lens reflex camera according to the exemplary embodiment.

FIG. 10A is a front view of a piezoelectric element and the optical low-pass filter to explain a relative relationship between the piezoelectric element and the optical low-pass filter and a relationship between the occurring forces, and FIG. 10B is a side view thereof.

DESCRIPTION OF THE EMBODIMENTS

Figure 1:
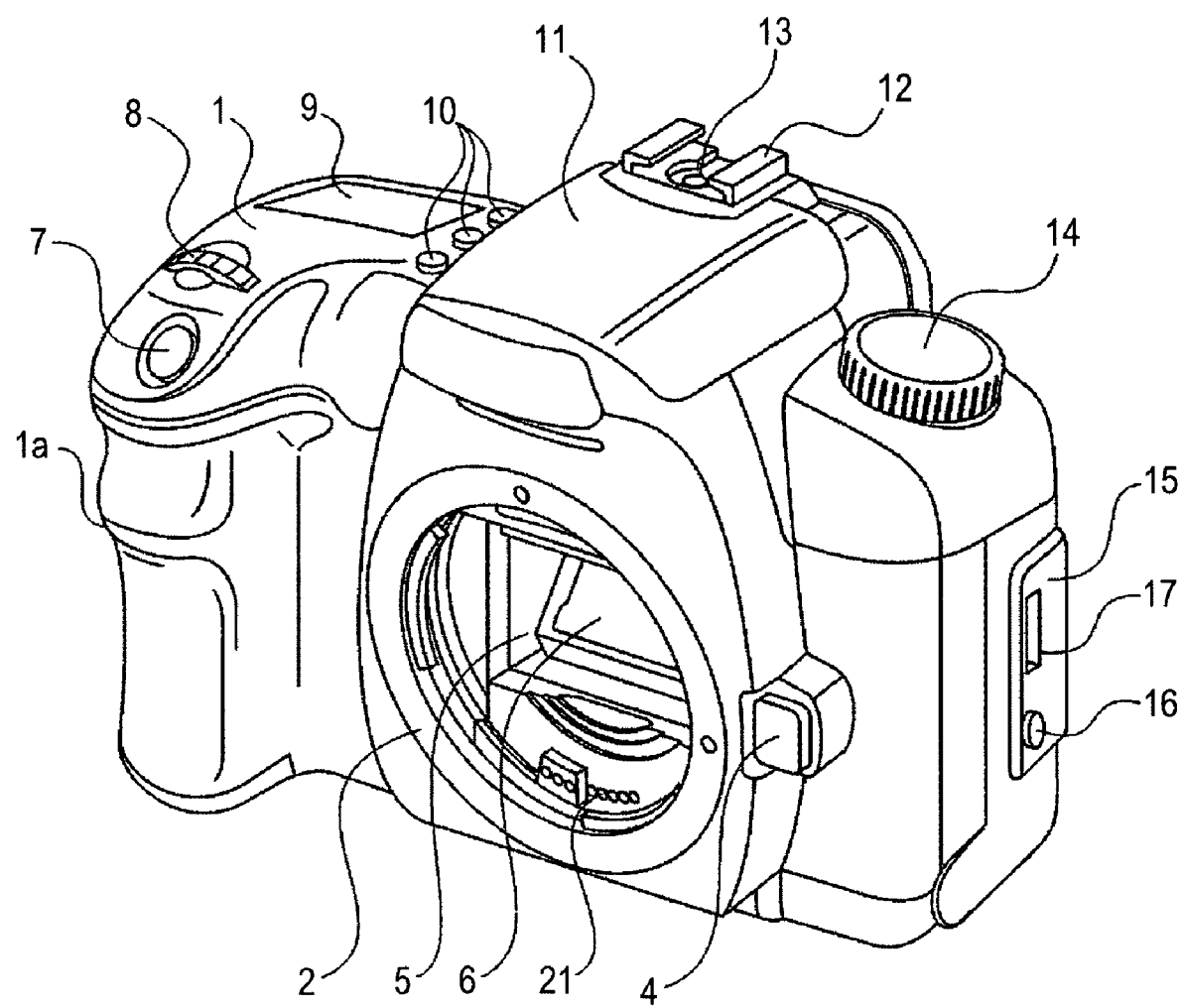
FIG. 1 is a front perspective view of a digital single-lens reflex camera according to an exemplary embodiment.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate.

Notice that similar reference numerals and letters refer to similar items in the following figures, and thus once an item is defined in one figure, it may not be discussed for following figures.

At least one exemplary embodiment of the present invention will be described in detail in accordance with the accompanying drawings.

Figure 2:
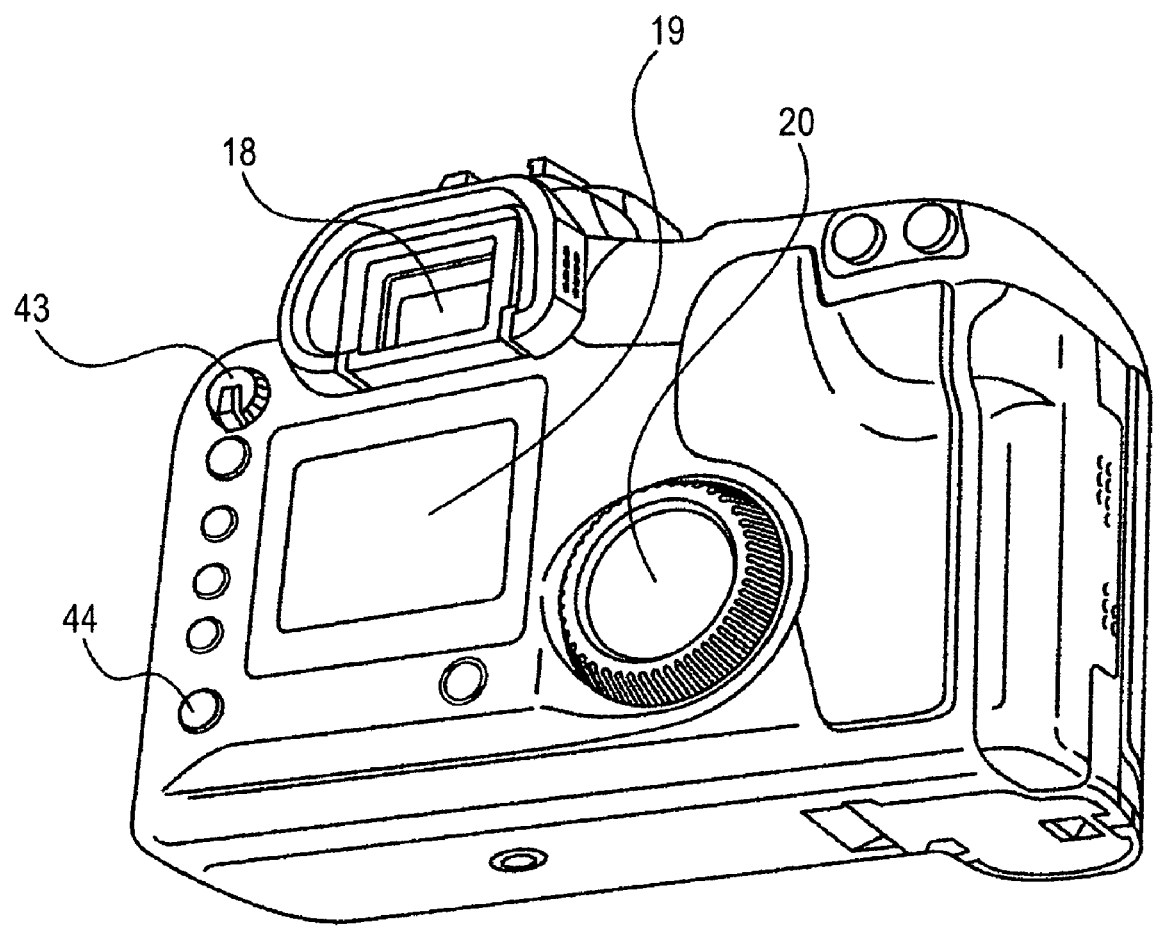
FIG. 2 is a rear perspective view of the digital single-lens reflex camera according to the exemplary embodiment.

FIGS. 1 and 2 show external views of a digital single-lens reflex camera according to an exemplary embodiment. More specifically, FIG. 1 is a front perspective view of the camera with an image taking lens unit detached, and FIG. 2 is a rear perspective view of the camera.

Referring to FIG. 1, a camera body 1 includes a grip unit 1a protruding frontward formed so as to allow a user to easily grasp the camera with stability. A mount unit 2 is configured to secure the detachable image taking lens unit (not shown) to the camera body 1. A mount contact 21 functions to permit signals (e.g., a control signal, a status signal, and a data signal) to flow between the camera body 1 and the image taking lens unit and to supply electric power to the image taking lens unit. The mount contact 21 can be constructed to permit various communications (e.g., optical communications, voice communications, and other communications, as well as electrical communications).

A lens unlock button 4 is configured to be pressed down when a user aims to detach the image taking lens unit. A mirror box 5 is disposed inside the camera casing and is configured to receive guided a light beam, for image taking, that has passed through the image taking lens unit. Inside the mirror box 5, a quick return mirror 6 is disposed. The quick return mirror 6 can be in a first state in which the quick return mirror 6 is maintained at an angle (e.g., about 45 degrees) with respect to the optical axis for image taking to guide a light beam for image taking toward a pentaprism 22 (see FIG. 3A) and in a second state in which the quick return mirror 6 is maintained at a position that is withdrawn from a light beam for image taking to guide the light beam toward an image pickup element 33 (see FIG. 3A).

A shutter button 7 serves as a start switch to start image taking, a main-operation dial 8 can be used to set a shutter speed and an f-stop value in accordance with an operational mode in image taking, and operational-mode setting upper buttons 10 for an image taking system can be disposed adjacent to the grip unit 1a on the top of the camera body 1. Part of the results of operating these operational components can be displayed on a display system, for example a liquid-crystal display (LCD) panel 9.

The shutter button 7 can be configured to switch a first switch (SW1), which is referred to as 7a described below, in the ON state with a first stroke and switch a second switch (SW2), which is referred to as 7b described below, in the ON state with a second stroke.

The operational-mode setting upper buttons 10 can be used to make a selection between continuous shooting or single frame shooting by one press of the shutter button 7, can set a self-timer shooting mode, and can be configured to facilitate the setting status to be displayed on the LCD panel 9. Note that although an LCD panel 9 is discussed as an example of a display device, exemplary embodiments are not limited to a particular type of display device.

An internal flash unit 11, which can pop up out of the camera body 1, an accessory shoe 12 for attaching external flash units, and a flash contact 13 can be disposed on the center of the top of the camera body 1. A taking-mode setting dial 14 can be disposed on a right portion of the top of the camera body 1.

An openable external-terminal lid 15 can be disposed on a side face opposite to the grip unit 1a. When the external-terminal lid 15 is open, a video-signal output jack 16 and a universal serial bus (USB) output connector 17 each serving as an external interface are exposed.

Referring to FIG. 2, a viewfinder eyepiece window 18 can be disposed at the upper portion on the back of the camera body 1, and a color liquid-crystal monitor 19 or other display device can be disposed in the vicinity of the central portion on the back of the camera body 1. A sub-operation dial 20 arranged next to the color liquid-crystal monitor 19 performs an auxiliary function of the main-operation dial 8 and is used to, for example, set the amount of exposure correction with respect to a correct exposure value calculated by an autoexposure (AE) device in an AE mode. In a manual mode, in which a shutter speed and an f-stop value are set by a user, the main-operation dial 8 is used to set the shutter speed, and the sub-operation dial 20 is used to set the f-stop value. The sub-operation dial 20 is also used to display and select a taken image to be displayed on the color liquid-crystal monitor 19.

A main switch 43 can be used to start or stop the camera.

A cleaning instruction operating member 44 can be used to start operating in a cleaning mode and to give instructions on operation of shaking a foreign object on an optical element (e.g., dust off the low-pass filter). The details will be described below.

Figure 3B:
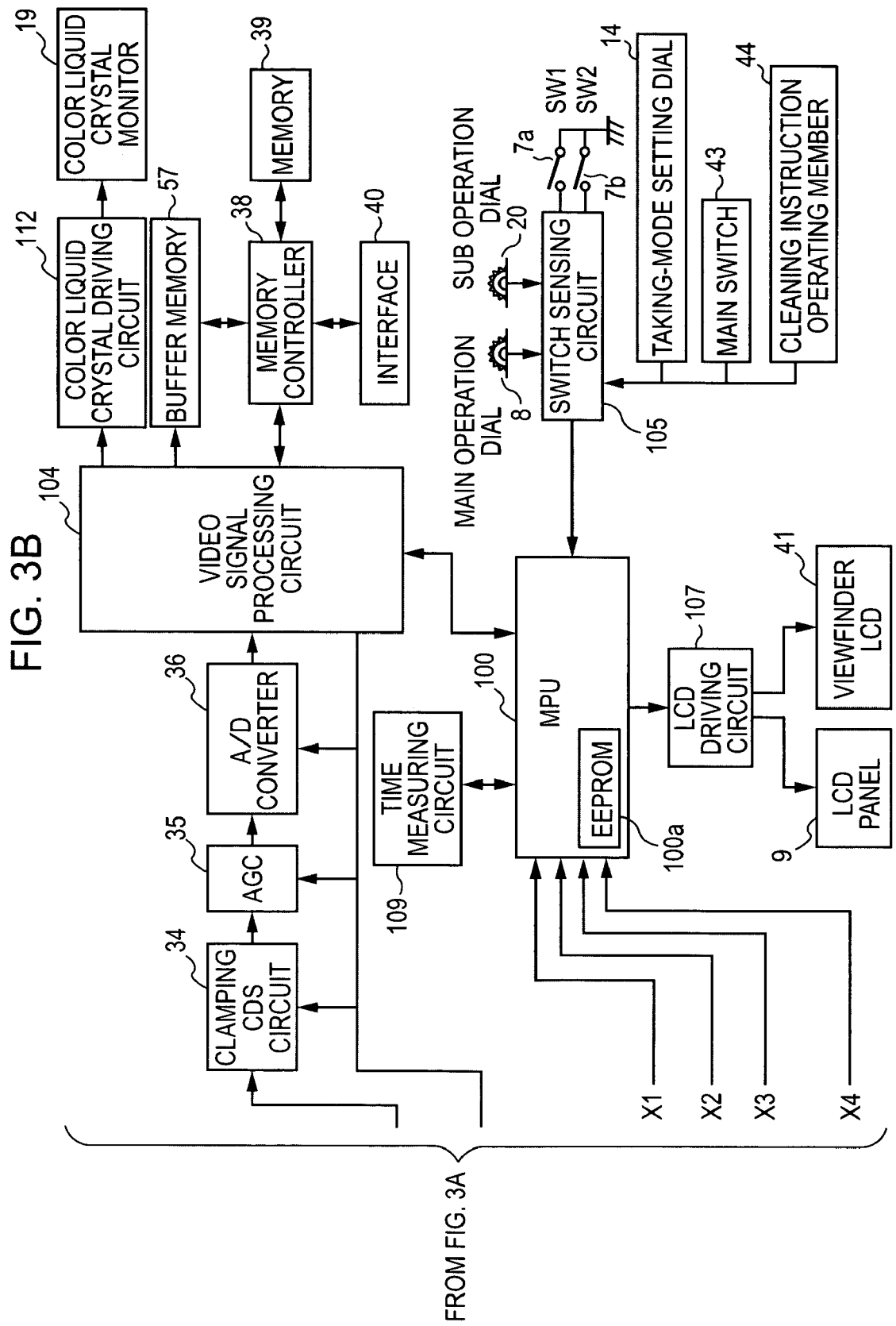

FIG. 3 (FIGS. 3A and 3B) are block diagrams of a main electrical structure of the digital single-lens reflex camera according to the exemplary embodiment. In FIG. 3A, the same components as those in the Figures described above are indicated by the same reference numerals.

A MPU 100 is a central processing unit (e.g., which can be part of a microcomputer) incorporated in the camera body 1 and serves to control operation of the camera so as to perform various processes and give various instructions to the components.

An electrically erasable programmable read-only memory (EEPROM) 100a can be incorporated in the MPU 100 and can be capable of storing information on measured time and other information.

The MPU 100 is connected to a mirror driving circuit 101 (via X2), a focus detecting circuit 102 (via X2), a shutter driving circuit 103 (via X2), a video-signal processing circuit 104, a switch sensing circuit 105, and a metering circuit 106 (via X1). The MPU 100 can also be connected to an LCD driving circuit 107, a battery check circuit 108 (via X4), a time measuring circuit 109, a power supply circuit 110 (via X3), and a piezoelectric-element driving circuit 111 (via X2). These circuits operate under control of the MPU 100.

The MPU 100 communicates with a lens control circuit 201 (e.g., via X2) disposed within the image taking lens unit via the mount contact 21. The mount contact 21 also functions to transmit a signal to the MPU 100 when the image taking lens unit is connected to the mount contact 21. Therefore, the lens control circuit 201 can communicate with the MPU 100, so that an image taking lens 200 in the image taking lens unit and a diaphragm 204 can be driven via an autofocus (AF) driving circuit 202 and a diaphragm driving circuit 203.

In the exemplary embodiment, the image taking lens 200 is indicated as one lens element for the sake of convenience. In reality, the image taking lens 200 can include one or more lens groups having a plurality of lens elements.

The AF driving circuit 202 is typically formed by a stepping motor and configured to adjust the image taking lens 200 so as to focus a light beam for image taking on the image pickup element 33 by changing the position of a focus lens in the image taking lens 200 by control of the lens control circuit 201. The diaphragm driving circuit 203 is typically formed of an auto iris and configured to acquire an optical f-stop value by changing the diaphragm 204 in concert with the lens control circuit 201.

The quick return mirror 6 can be configured to guide a light beam for image taking that has passed through the image taking lens 200 to the pentaprism 22 where part of the light beam passes therethrough to a sub mirror 30. The sub mirror 30 can be configured to guide the light beam for image taking that has passed through the quick return mirror 6 to a focus-detecting sensor unit 31.

The mirror driving circuit 101 can be configured to drive the quick return mirror 6 between a first position that permits a subject image to be viewed from a viewfinder and a second position in which the mirror is withdrawn from the light beam for image taking. At the same time, the mirror driving circuit 101 can be configured to drive the sub mirror 30 between a first position that guides the light beam for image taking to the focus-detecting sensor unit 31 and a second position in which the sub mirror is withdrawn from the light beam. The mirror driving circuit 101 typically comprises a DC motor, and a gear train.

The focus-detecting sensor unit 31 can be a focus detecting sensor that uses a known phase difference method and includes a field lens disposed adjacent to an imaging surface (not shown), a reflective mirror, a secondary imaging lens, a diaphragm, and a line sensor composed of a plurality of CCDs. A signal output from the focus-detecting sensor unit 31 is sent to the focus detecting circuit 102. The sent signal is converted into a subject image signal and then sent to the MPU 100. The MPU 100 performs focus detection calculations in accordance with phase difference detection on the basis of the subject image signal and determines the amount of defocus and the direction of defocus. On the basis of this, the MPU 100 drives the focus lens in the image taking lens 200 to an in-focus position via the lens control circuit 201 and the AF driving circuit 202.

The pentaprism 22 is an optical member for converting a light beam for image taking reflected from the quick return mirror 6 so that the light beam produces an erect image. A user can view a subject image from the viewfinder eyepiece window 18 via a viewfinder optical system.

The pentaprism 22 is also configured to guide part of the light beam for image taking to a metering sensor 37. The metering circuit 106 is configured to receive output from the metering sensor 37, convert the output into a luminance signal corresponding to each area on a viewing plane, and output the luminance signal to the MPU 100. The MPU 100 is configured to calculate an exposure value in accordance with the received luminance signal.

A mechanical focal-plane shutter unit 32 is configured to block the light beam for image taking when a user is viewing the subject image from the viewfinder. When an image is taken, a desired exposure time can be acquired from the difference between a time at which a preceding blade set moves and that of a following blade set on the basis of a release signal. The focal-plane shutter unit 32 is controlled by the shutter driving circuit 103, which has received instructions from the MPU 100.

The image pickup element 33 can use a CMOS integrated circuit serving as an image pickup device. The image pickup device can be of various types, for example a CCD type, a CMOS type, a CID type, and other photoelectric conversion device types as known by one of ordinary skill in the relevant arts and equivalents.

A clamping/correlation double sampling (clamping CDS) circuit 34 performs fundamental analog processing before analog-to-digital (A/D) conversion and can change the clamping level. An automatic gain control (AGC) 35 performs fundamental analog processing before A/D conversion and can change the basic AGC level. An A/D converter 36 converts an analog signal output from the image pickup element 33 into a digital signal.

An optical low-pass filter 410 can have a structure in which alternate layers of crystal birefringent plates and phase plates are bonded to an infrared cut filter.

A multilayer piezoelectric element 430 can be configured to be vibrated by the piezoelectric-element driving circuit 111 that has received instructions from the MPU 100 and transmits the vibration thereof to the optical low-pass filter 410.

An image pickup unit 400 can have a structure in which the optical low-pass filter 410, the piezoelectric element 430, the image pickup element 33, and other components (described below) are combined into one unit. The details of the unit will be described below.

The video-signal processing circuit 104 performs general image processing (e.g., carried out by hardware for example, gamma/knee correction, filtering, and information combining for monitor display). Image data for monitor display output from the video-signal processing circuit 104 is displayed on the color liquid-crystal monitor 19 via a color liquid-crystal driving circuit 112.

The video-signal processing circuit 104 can also store image data in a buffer memory 57 via a memory controller 38 in response to instructions from the MPU 100. Additionally, the video-signal processing circuit 104 can also function to compress image data into, for example, data in Joint Photographic Experts Group (JPEG) format. In a case where images are successively taken, such as continuous shooting, after image data is temporarily stored in the buffer memory 57, unprocessed image data can be read in succession via the memory controller 38. Therefore, the video-signal processing circuit 104 can perform image processing and image compression in succession independently of the input speed of image data from the A/D converter 36.

The memory controller 38 can also function to store in a memory 39 image data input from an external interface 40 (corresponding to the video-signal output jack 16 and the USB output connector 17 in FIG. 1) and to output the image data stored in the memory 39 from the external interface 40. The memory 39 is typically a flash memory detachable from the camera body 1, however any type of memory can be used.

The switch sensing circuit 105 is configured to transmit an input signal to the MPU 100 in accordance with the operating status of each switch. The switch SW1 7a is configured to be switched to the ON state with the first stroke of the shutter button 7. The switch SW2 7b is configured to be switched to the ON state with the second stroke of the shutter button 7. When the switch SW2 7b is switched to the ON state, an instruction to start image taking is then sent to the MPU 100. The switch sensing circuit 105 is connected to the main-operation dial 8, the sub-operation dial 20, the taking-mode setting dial 14, the main switch 43, and the cleaning instruction operating member 44.

The LCD (display) driving circuit 107 is configured to drive the LCD panel 9 and a viewfinder LCD 41 in accordance with instructions from the MPU 100. Note that although for this particular example LCD display panels are described, exemplary embodiments are not limited to LCD displays.

The battery check circuit 108 can be configured to check a battery for a predetermined period of time and send a detected output to the MPU 100. A power source unit 42 can be configured to supply necessary power to each camera component.

The time measuring circuit 109 is configured to determine the date and also measure a time period from when the main switch 43 is switched to the OFF state to when the main switch 43 is switched to the ON state, and can send a measurement value to the MPU 100 in response to instructions from the MPU 100. In other word, the MPU 100 causes the time measuring circuit 109 to start to measure a time period when the MPU 100 determines, based on the signal from the switch sensing circuit 105, that the main switch 43 is switched to the OFF state, and causes the time measuring circuit 109 to stop measuring the time period when the MPU 100 determines, based on the signal from the switch sensing circuit 105, that the main switch 43 is switched to the ON state.

An exemplary structure of the image pickup unit 400 is described in detail below with reference to FIGS. 4 to 10.

Figure 4:
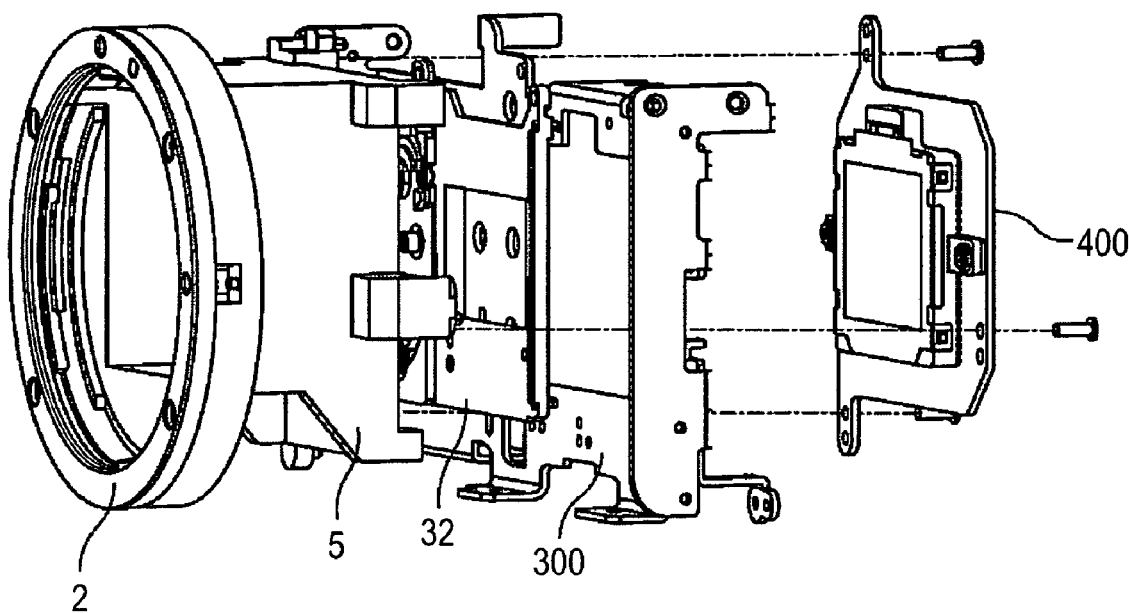
FIG. 4 is an exploded perspective view schematically showing an internal structure of the camera to illustrate a holding structure in the vicinity of a low-pass filter and an image pickup element.

FIG. 4 is an exploded perspective view schematically showing an internal structure of the camera to illustrate a holding structure in the vicinity of the low-pass filter 410 and the image pickup element 33 (not shown).

The focal-plane shutter unit 32, a chassis body 300 serving as a framework of the camera body, and the image pickup unit 400 are disposed with respect to the mirror box 5. In particular, the image pickup unit 400 is secured such that an image pickup surface of the image pickup element 33 is parallel to a mounting surface of the mount unit 2, which serves as the reference for mounting the image taking lens unit, with a predetermined gap disposed therebetween.

Figure 5:
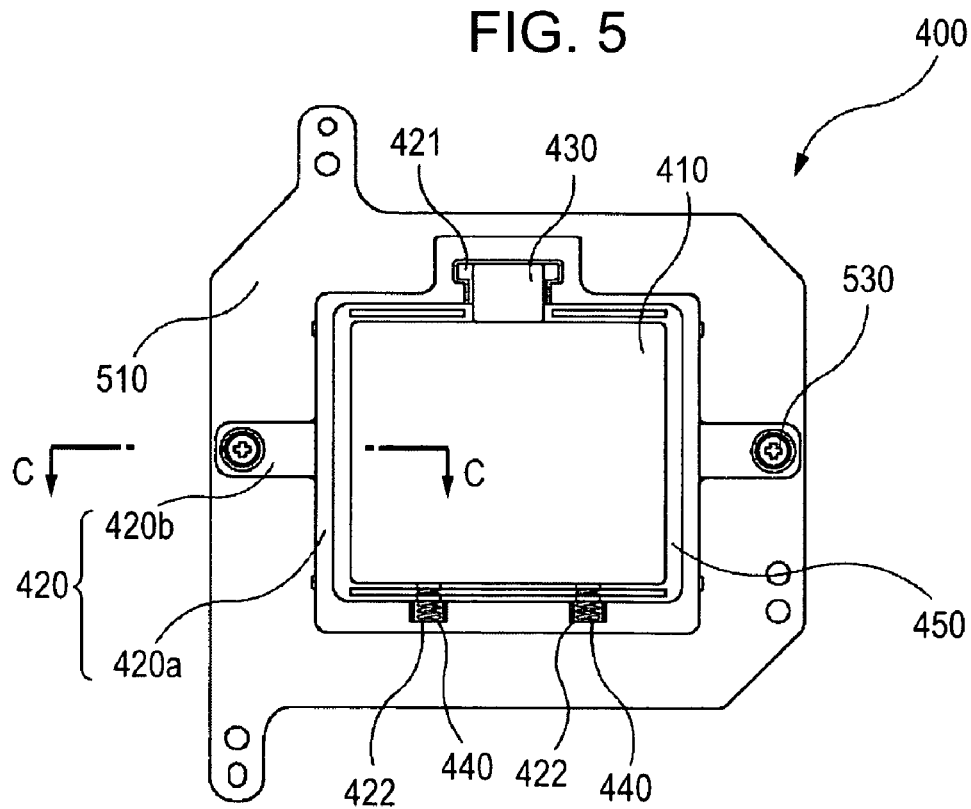
FIG. 5 is a front view of part of components of an image pickup unit.

FIG. 5 is a front view of part of the components of the image pickup unit 400.

An image pickup element holding member 510 can have a rectangular opening and secures the image pickup element 33 (not shown) so as to expose the image pickup element 33 in the opening. The image pickup element holding member 510 can take the form of a plate and can have three arms for being secured to the mirror box 5 with screws at the outer regions. Shoulder screws 530 will be described below with reference to FIG. 9 which shows a cross section taken along the line C-C in FIG. 5.

A low-pass filter holding member 420 includes a frame 420a for surrounding the periphery of the optical low-pass filter 410 and horizontally extending arms 420b for mounting and holding the optical low-pass filter 410. The low-pass filter holding member 420 can be formed from a resin or a metal material. An accommodation unit 421 for accommodating the piezoelectric element 430 is disposed on a first side of the frame 420a. The frame 420a and one end face of the piezoelectric element 430 are secured to each other (e.g., by bonding, fastening or other securing methods as known by one of ordinary skill in the relevant arts and equivalents).

Accommodation units 422 (for accommodating urging members 440 having resilient properties) are disposed on a second side of the frame 420a, opposite to the first side provided with the accommodation unit 421, so that the optical low-pass filter 410 is urged in the direction of the piezoelectric element 430.

In other words, the optical low-pass filter 410 is clamped between the piezoelectric element 430 and the urging members 440 so as to be flush therewith in the low-pass filter holding member 420. Therefore, the optical low-pass filter 410 follows expansion and contraction movement of the piezoelectric element 430.

Each of the urging members 440 can be formed by a leaf spring or coil spring formed from a metal material or can be formed from a polymer, such as rubber or plastic, or any other material as long as the urging member 440 is a resilient or elastic body. In the exemplary embodiment, the urging member 440 is arranged as a discrete member. However, instead of the urging member 440, the low-pass filter holding member 420 may have resilient properties so that the optical low-pass filter 410 can follow expansion and contraction movement of the piezoelectric element 430.

Figure 6:
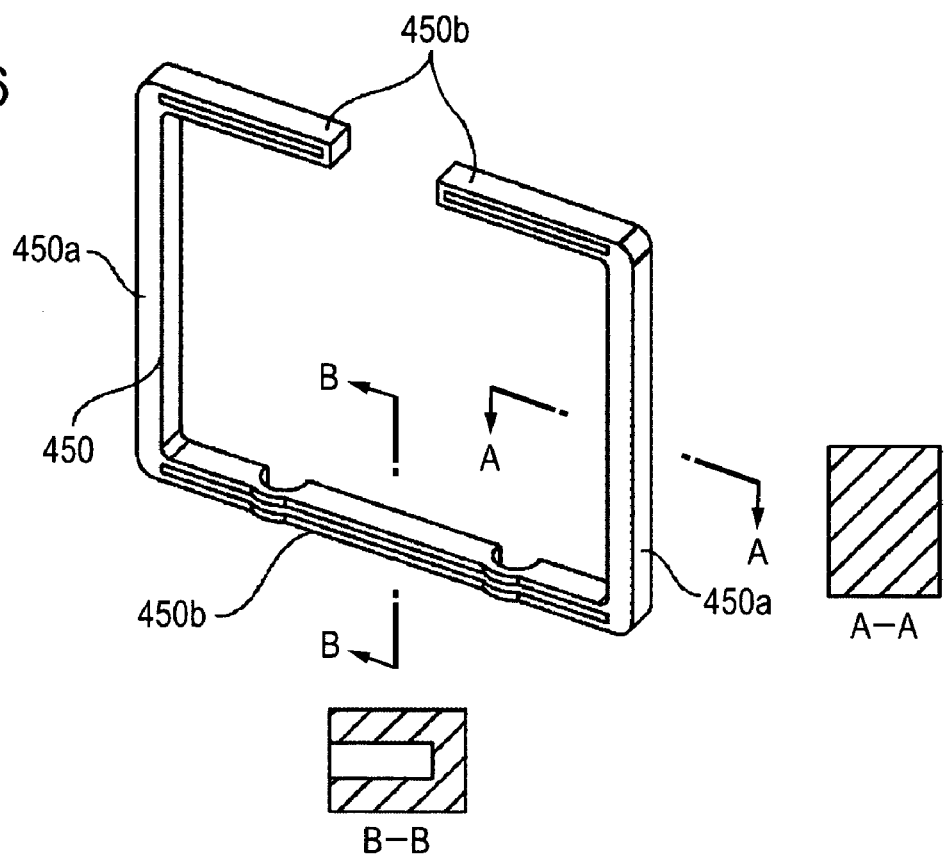
FIG. 6 is a detailed illustration of an elastic member.

A frame-shaped resilient or elastic member 450 can be arranged in a gap between four sides of the optical low-pass filter 410 and the low-pass filter holding member 420, as shown in FIG. 6.

FIG. 6 is a detailed illustration of the member 450. The member 450 includes first arms 450a extending in directions of expansion and contraction movement of the piezoelectric element 430 and second arms 450b perpendicular to the first arms 450a. The stiffness of each of the first arms 450a can differ from that of each of the second arms 450b. In order to allow the optical low-pass filter 410 to oscillate by following expansion and contraction movement of the piezoelectric element 430, in the resilient or elastic member 450, the stiffness of the second arm 450b which receives the effects of the expansion and contraction movement can be smaller than that of the first arm 450a. More specifically, the cross section of the first arm 450a taken along the line A-A exhibits a rectangular shape, whereas the cross section of the second arm 450b taken along the line B-B can exhibits a shape in which central part is removed from a rectangular shape.

A structure in which the stiffness of the first arm 450a differs from that of the second arm 450b is not limited to the above structure. For example, arms forming different members may be integrated with each other by co-injection molding or other methods.

The four sides of the optical low-pass filter 410 are sealed between the piezoelectric element 430 and the resilient or elastic member 450 so as to have little or no gap therebetween with respect to the low-pass filter holding member 420.

In the exemplary embodiment, the piezoelectric element 430 is a multilayer piezoelectric element formed from alternate layers of known piezoelectric substances and internal electrodes. For example a d33-type multilayer piezoelectric element, in which a voltage is applied along a lamination direction of piezoelectric substances, can be used as the piezoelectric element 430. As a result, a larger amount of amplitude (displacement) in the lamination direction can be obtained. In other words, the optical low-pass filter 410 can be largely moved in the direction of vibration. There are various types of piezoelectric elements. The piezoelectric element can be of any type as long as it can produce displacement in a plane direction of the optical low-pass filter 410, i.e., in a direction perpendicular to the optical axis. An exemplary shape of the piezoelectric element 430 will be described below with reference to FIGS. 10A and 10B.

In the exemplary embodiment, the optical low-pass filter 410 is in direct contact with the piezoelectric element 430. Alternatively, a spacer can be disposed therebetween. In this case, since the piezoelectric element 430 can provide the spacer with vibration, constraints on layout can be eased.

As described above, the piezoelectric element 430 can be held in a direction where the direction of the expansion and contraction movement caused by application of a voltage is substantially perpendicular to the optical axis (i.e., in the vertical direction of the camera). Here, the piezoelectric element 430 is bonded and secured to the low-pass filter holding member 420, whereas the piezoelectric element 430 is not bonded to the optical low-pass filter 410 and is just in contact therewith. In other words, a vibrating surface of the piezoelectric element 430 with respect to the optical low-pass filter 410 is not secured to the optical low-pass filter 410, although in other exemplary embodiments it can be.

Supporting the optical low-pass filter 410 by the resilient or elastic member 450 permits the optical low-pass filter 410 to move along the optical axis for image taking by a predetermined amount, as well as in the direction of expansion and contraction movement of the piezoelectric element 430. In other words, when the optical low-pass filter 410 receives vibration of the piezoelectric element 430, the optical low-pass filter 410 is permitted to be inclined by a certain amount with respect to a plane substantially perpendicular to the optical axis for image taking. Therefore, a foreign object on the optical low-pass filter 410 is permitted to receive acceleration in the direction of the optical axis for image taking. This facilitates removal of foreign objects. However, in a case where the optical low-pass filter 410 is permitted to be inclined with the plane substantially perpendicular to the optical axis for image taking, if the piezoelectric element 430 and the optical low-pass filter 410 are bonded together, the piezoelectric element 430 would be subjected to shearing stress. In particular, when a multilayer piezoelectric element is used as the piezoelectric element 430, as in the example of the exemplary embodiment, the piezoelectric element 430 can be broken by such shearing stress.

In a case where the vibrating surface of the piezoelectric element 430 is not bonded to the optical low-pass filter 410, i.e., is only in contact with the optical low-pass filter 410, even if the optical low-pass filter 410 becomes inclined with respect to the plane perpendicular to the optical axis for image taking, the piezoelectric element 430 is not subjected to shearing stress. This is because, when the optical low-pass filter 410 is inclined in this way, the vibrating surface of the piezoelectric element 430 is relatively displaced from a contact surface of the optical low-pass filter 410, and therefore, the piezoelectric element 430 does not directly receive a rotational force.

However, when the vibrating surface of the piezoelectric element 430 is not bonded to the optical low-pass filter 410, a problem arises that decreases the capability of the optical low-pass filter 410 to follow the vibration of the piezoelectric element 430. To address this problem, as described above, the optical low-pass filter 410 can be clamped between the piezoelectric element 430 and the urging members 440 so as to be flush therewith. In other words, the optical low-pass filter 410 is urged from a side opposite to the piezoelectric element 430 with springs, resilient members, so that the optical low-pass filter 410 is almost always in contact with the piezoelectric element 430 even when the piezoelectric element 430 is driven in the direction of contraction.

Therefore, the chance that the piezoelectric element 430 is broken or damaged by being subjected to shearing stress can be reduced, and the optical low-pass filter 410 can follow the vibration of the piezoelectric element 430 satisfactorily.

Figure 7:
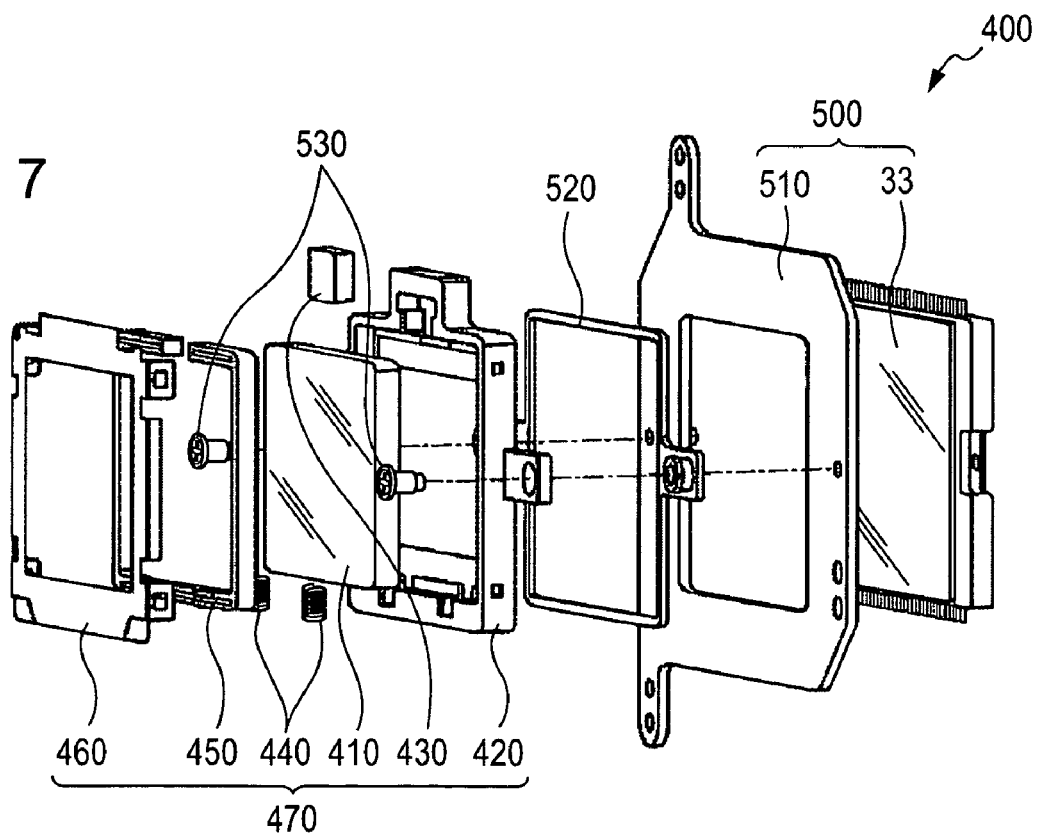
FIG. 7 is an exploded perspective view of the image pickup unit to explain the components thereof.

FIG. 7 is an exploded perspective view of the image pickup unit 400, which is described above with reference to FIGS. 4 and 5, to further explain the components thereof.

An image pickup element unit 500 includes at least the image pickup element 33 and an image pickup element holding member 510. Low-pass filter unit 470 includes at least an optical low-pass filter 410, a low-pass filter holding member 420, piezoelectric element 430, urging members 440, elastic member 450, and a restraining member 460.

The restraining member 460 can be configured to restrain the optical low-pass filter 410 from moving along the optical axis for image taking by sandwiching the optical low-pass filter 410 between the restraining member 460 and the low-pass filter holding member 420 with a predetermined gap. This restraint reduces the inclination of the optical low-pass filter 410 at an angle greater than a predetermined angle with respect to the plane perpendicular to the optical axis for image taking.

The restraining member 460 can have an opening for restraining the optical low-pass filter 410 and is configured to block a light beam for image taking that enters an area other than the opening. This prevents a light beam for image taking from entering the image pickup element 33 from the outer regions of the optical low-pass filter 410, and can reduce the chance of a ghost image from being created from reflected light.

A rubber sheet 520 is resilient (i.e. elastically deformable). The low-pass filter unit 470 is attached to the image pickup element unit 500 by being secured to the image pickup element holding member 510 with the shoulder screws 530 (or other fastening device) via the arms 420b of the low-pass filter holding member 420, so that the rubber sheet 520 is interposed therebetween.

Figure 8:
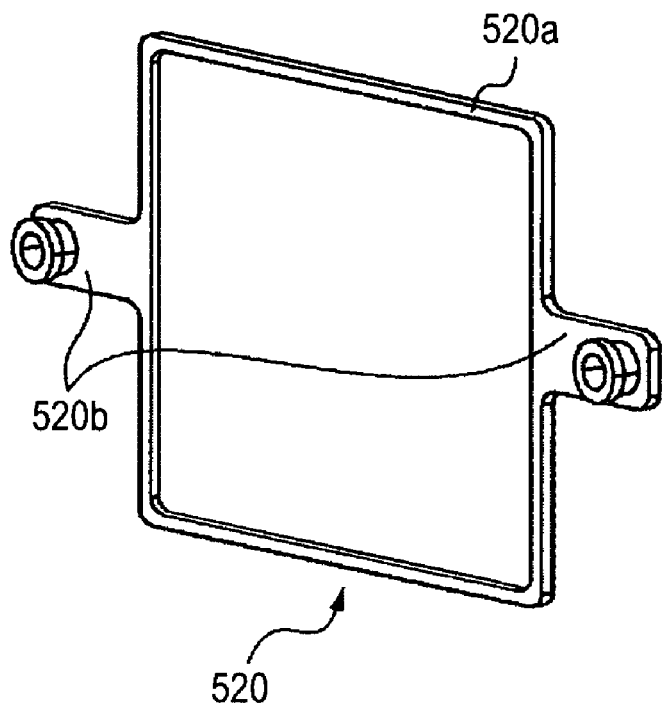
FIG. 8 is a detailed illustration of a rubber sheet.

FIG. 8 is a detailed illustration of the rubber sheet 520. As shown in FIG. 8, the rubber sheet 520 has a structure in which a frame 520a and two opposing arms 520b including supporting portions for supporting the shoulder screws 530 are integrated with each other.

A first surface of the frame 520a adjacent to the image pickup element 33 is in close contact with the image pickup element holding member 510, and a second surface of the frame 520a adjacent to the optical low-pass filter 410 is in close contact with the frame 420a (FIG. 5) of the low-pass filter holding member 420. Therefore, the gap between the low-pass filter holding member 420 and the image pickup element 33 is sealed by the rubber sheet 520, and the gap between the optical low-pass filter 410 and the low-pass filter holding member 420 is sealed with the piezoelectric element 430 and the elastic member 450. As a result, the gap between the optical low-pass filter 410 and the image pickup element 33 is a closed space, reducing the entrance of foreign objects (e.g., dust).

Additionally, even when the piezoelectric element 430 is vibrated, the vibration of the low-pass filter unit 470 is less prone to being transmitted to the image pickup element 33 because of the floating support structure realized by elasticity of the rubber sheet 520. The details of the structure are described with reference to FIG. 9.

Figure 9:
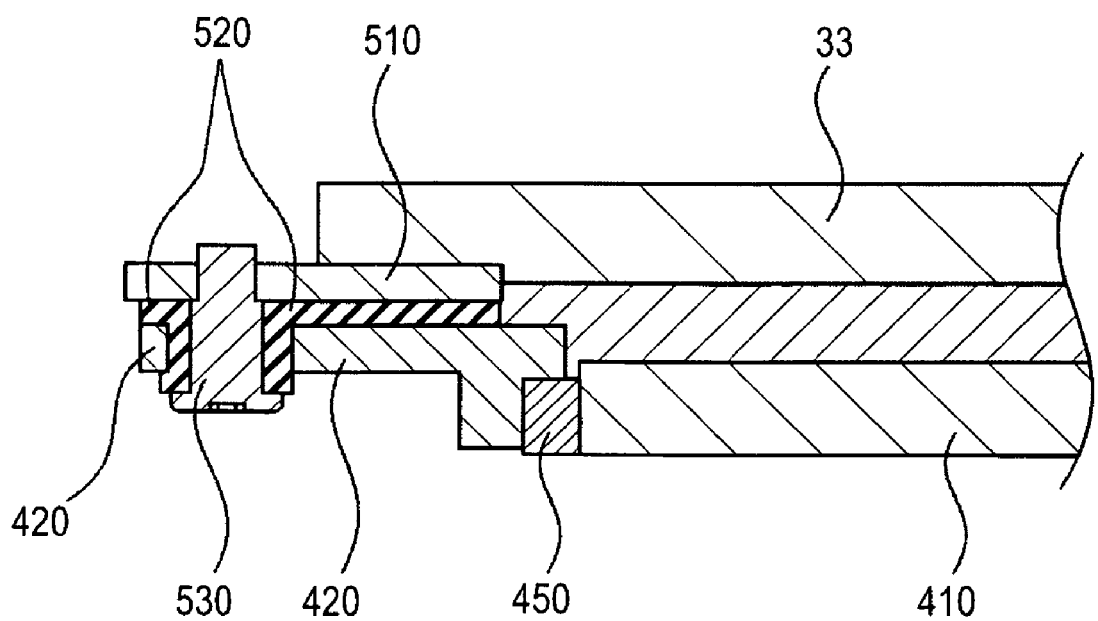
FIG. 9 is a sectional view of the image pickup unit taken along the line C-C of FIG. 5.

FIG. 9 is a sectional view taken along the line C-C of FIG. 5.

As described above, the low-pass filter unit 470 is formed such that the optical low-pass filter 410 is supported by the elastic member 450 which is supported by the low-pass filter holding member 420. The image pickup element unit 500 is formed such that the image pickup element 33 is supported by the image pickup element holding member 510. The rubber sheet 520 is interposed between the low-pass filter unit 470 and the image pickup element unit 500. The shoulder screw 530 supports the low-pass filter holding member 420 such that the rubber sheet 520 is interposed between the image pickup holding element (510) and the low-pass filter holding member (420). In other words, since the elastic member is interposed therebetween, the structure of supporting the optical low-pass filter 410 is a floating support structure.

The rubber sheet 520 in the exemplary embodiment may be another sealing member as long as it can reduce the chance of the entrance of a foreign object and absorb or damp vibrations so that any vibrations are not transmitted from the optical low-pass filter 410 to the image pickup element 33. For example, the rubber sheet 520 can be a double-sided tape that is formed of sponge or a gel sheet, the tape and the sheet having a predetermined thickness.

Figure 10B:
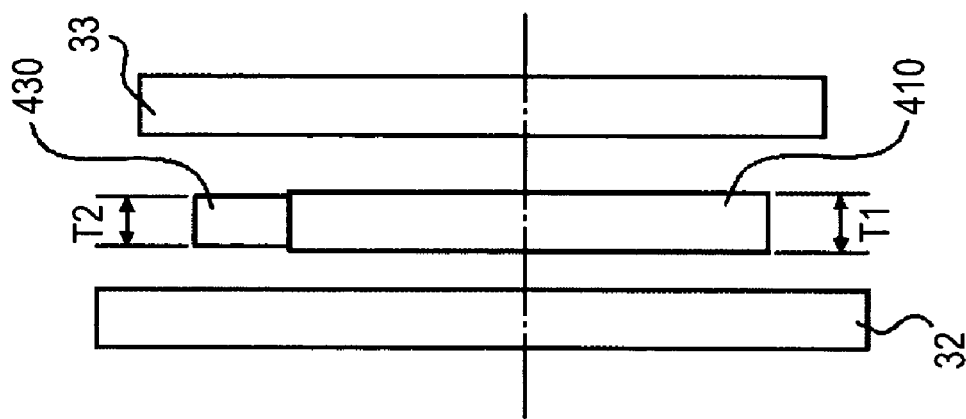
FIGS. 10A and 10B are conceptual drawings to explain occurring forces.
Figure 10A:
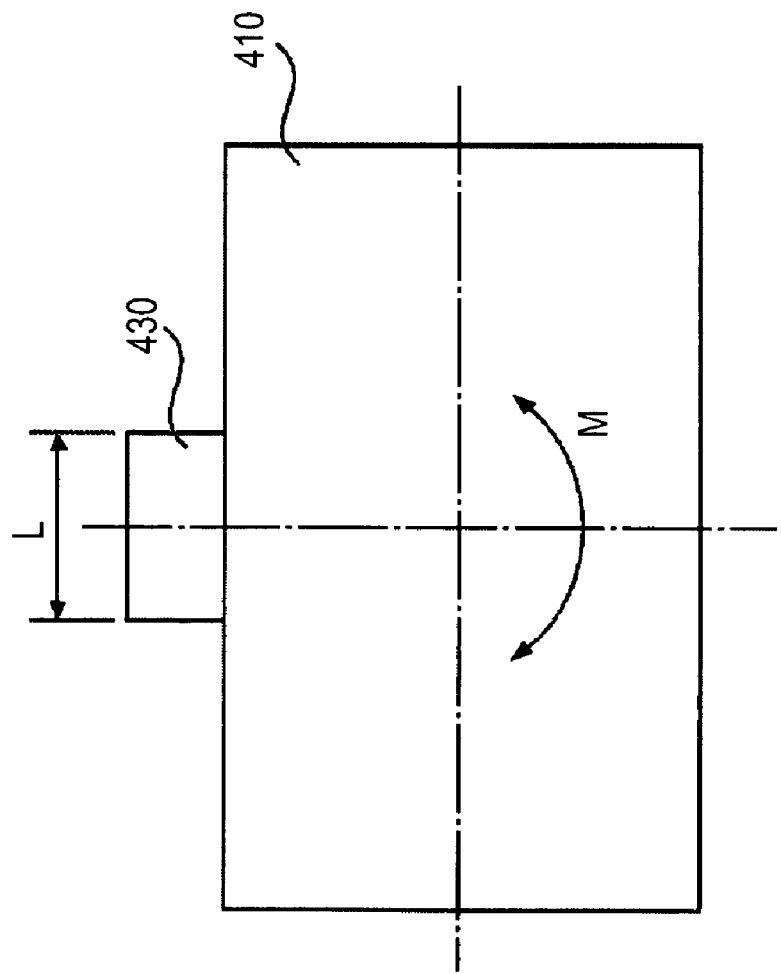

FIG. 10A is a front view of the piezoelectric element 430 and the optical low-pass filter 410 to explain the relative relationship between the piezoelectric element 430 and the optical low-pass filter 410 and the relationship between the forces occurring in use. FIG. 10B is a side view thereof.

In the exemplary embodiment, in two sides perpendicular to the lamination direction (vibration direction) of the piezoelectric element 430, the length of a first side shown in FIG. 10A in a direction perpendicular to the optical axis is represented by L, and the length of a second side shown in FIG. 10B in the same direction as the optical axis is represented by T2. As previously described, in the optical axis, other components (e.g., the focal-plane shutter unit 32 and the image pickup element 33) are arranged close to the piezoelectric element 430. Therefore, in order to reduce the occurrence of an increase in size of the camera, the length T2 can be equal to or smaller than the thickness T1 of the optical low-pass filter 410. The length L can be larger than the thickness T1 and is a length suitable for obtaining the driving force required for vibrating the optical low-pass filter 410. This is because, as explained above with reference to FIG. 5, the accommodation unit 421 of the low-pass filter holding member 420 is arranged in the direction perpendicular to the optical axis, and the length of the accommodation unit 421 can be accommodated relatively easily within the width of the optical low-pass filter 410. The driving force required for vibration is proportional to the area of the piezoelectric element, L×T2. The required force is thus obtained by choosing these two lengths appropriately.

Increasing the length L enables buckling stress of the piezoelectric element 430 to be small, even when a larger moment occurs in the optical low-pass filter 410 due to rotation in a plane perpendicular to the optical axis. This can reduce the chance of the piezoelectric element 430 from being damaged by buckling.

More specifically, the stress F occurring at an end of the piezoelectric element 430 by the moment M occurring due to rotation in the plane perpendicular to the optical axis is represented by the following expression (1):

$$F = M/(L/2) \tag{1}$$

As is obvious from expression (1), the stress F occurring at the end of the piezoelectric element 430 varies depending on the moment M and the length L of the piezoelectric element 430 in the direction perpendicular to the optical axis. According to expression (1), if the length L is maximized, the stress F occurring at the end of the piezoelectric element 430 can be smaller, and as a result, the stress F can fall within a range of allowable buckling stress.

Allowable buckling stress indicates an upper limit of stress applied to the piezoelectric element 430 to drive the piezoelectric element 430 to normally drive the piezoelectric element 430, to reduce the chance of damage thereto.

An exemplary vibration of the optical low-pass filter 410 is described next.

When the MPU 100, serving as a control unit, performs control such that a predetermined periodic voltage is applied to the piezoelectric element 430, the piezoelectric element 430 vibrates in a direction approximately perpendicular to the optical axis, i.e., in the vertical direction of the camera. The optical low-pass filter 410 is clamped between the piezoelectric element 430 and the optical low-pass filter 410 so as to be flush therewith. As a result, since the optical low-pass filter 410 and the piezoelectric element 430 are held so as to be almost always in contact with each other, the vibration of the piezoelectric element 430 is transmitted to the optical low-pass filter 410.

As previously described, the gap between the low-pass filter holding member 420 and the image pickup element 33 is sealed by the rubber sheet 520, and the gap between the optical low-pass filter 410 and the low-pass filter holding member 420 is sealed by the piezoelectric element 430 and the elastic member 450. As a result, the gap between the optical low-pass filter 410 and the image pickup element 33 is a closed space that reduces the chance of entrance of foreign objects (e.g., dust). At the same time, since the rubber sheet 520 is interposed between the low-pass filter unit 470, including the optical low-pass filter 410, and the image pickup element unit 500, the vibration of the low-pass filter unit 470 is absorbed into the rubber sheet 520. As a result, very little vibration is transmitted from the low-pass filter unit 470 to the image pickup element 33.

Therefore, even if the piezoelectric element 430 is vibrated, the vibration has little effect on the image pickup element 33. As a result, the components to be subjected to vibration can be confined, and the optical low-pass filter 410 (which is particularly desired to be vibrated) can be vibrated selectively. Therefore, the total mass of the components that are subjected to vibration can be reduced, and the energy required for driving the piezoelectric element 430 can be reduced.

Additionally, since the bulk of the vibration of the optical low-pass filter 410 is not transmitted to the image pickup element 33, the chance of the image pickup element 33 from being damaged is reduced, for example, from adhesive peeling. Furthermore, when the camera is shocked, very little of that shock is transmitted to the piezoelectric element 430. Therefore, the chance of the piezoelectric element 430 being broken or damaged by a shock provided to the camera can be reduced.

As previously described, in the particular example of the exemplary embodiment described the optical low-pass filter 410 and the piezoelectric element 430 are not bonded together, i.e., both are not connected together. Therefore, even if a periodic voltage is applied to the piezoelectric element 430 and the piezoelectric element 430 expands and contracts, in the piezoelectric element 430, a force occurs only in a direction that pushes the optical low-pass filter 410 but does not occur in the opposite direction in which the optical low-pass filter 410 pulls the piezoelectric element 430. Therefore, even if a high-frequency voltage in an ultrasonic range is applied to the piezoelectric element 430, an excessive tensile force is not exerted on the piezoelectric element 430. This can reduce the piezoelectric element 430 from being damaged by exfoliation in laminated areas.

An exemplary operation for removing dust or other foreign objects from the surface of the optical low-pass filter 410 according to the exemplary embodiment is described next.

When the cleaning instruction operating member 44 is operated by a user, the camera body 1 is shifted to a cleaning mode in response to an instruction to start cleaning. In the present exemplary embodiment, a cleaning instruction operating member 44 is provided. However, the present invention is not limited to this. An operating member for providing an instruction to shift into the cleaning mode is not limited to a mechanical button. For example, a user may provide the instruction by making a selection in a menu appearing on the color liquid-crystal monitor 19 with a cursor key or with an indicating button.

Shifting to the cleaning mode can be automatically performed in a normal camera sequence, for example when the power source is switched on, or can be performed in accordance with the number of image taking operations, or by the date.

The power supply circuit 110 supplies the power required for operating in the cleaning mode to each component of the camera body 1 as necessary. In parallel with this, the power supply circuit 110 detects the remaining battery life of the power source unit 42, and outputs the detected value to the MPU 100.

When the MPU 100 receives a signal to start operating in the cleaning mode, the MPU 100 sends a driving signal to the piezoelectric-element driving circuit 111. When the piezoelectric-element driving circuit 111 receives the driving signal from the MPU 100, the piezoelectric-element driving circuit 111 produces a periodic voltage required for driving the piezoelectric element 430 and applies the voltage to the piezoelectric element 430. The piezoelectric element 430 expands or contracts depending on the applied voltage. When the piezoelectric element 430 expands, the optical low-pass filter 410 is pushed by the piezoelectric element 430 and moved in a direction substantially perpendicular to the optical axis (in a plane direction) and the urging members 440 are compressed by an amount of movement. When the piezoelectric element 430 contracts, the optical low-pass filter 410 is urged against the piezoelectric element 430 by the urging members 440, and so the optical low-pass filter 410 follows the contraction of the piezoelectric element 430 and moves accordingly. While the periodic voltage is applied to the piezoelectric element 430, such behavior is repeated, and the optical low-pass filter 410 follows the periodic expansion and contraction movements of the piezoelectric element 430, and is vibrated in a direction substantially perpendicular to the optical axis.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-322375 filed Nov. 7, 2005, which is hereby incorporated by reference herein in its entirety.

What is claimed is:

1. An image pickup apparatus comprising:
    an image pickup element configured to convert an optical image of a subject into an electric signal;
    an optical member configured to modulate an incident light beam into a predetermined light beam and output the predetermined light beam, the optical member having a substantially rectangular shape and being disposed in front of the image pickup element along an optical axis for image taking;
    a piezoelectric element configured to contact a surface perpendicular to a light incident surface of the optical member and provide vibration to the optical member in a direction substantially perpendicular to the optical axis for image taking, wherein the vibrating surface of the piezoelectric element is not bonded to the surface perpendicular to the light incident surface of the optical member;
    an elastic supporting member configured to support the optical member in a floating state so as to facilitate the oscillation of the optical member and to seal a space between the image pickup element and the optical member, the elastic supporting member being formed from a polymer;
    an urging member configured to urge the optical member supported by the elastic supporting member in the direction of the piezoelectric element, wherein the urging member urges the surface of the optical member which faces the surface of the optical member with which the piezoelectric element contacts even when the piezoelectric element is driven in the direction of contraction; and
    a control unit configured to control the vibration provided by the piezoelectric element.

2. An image pickup apparatus as claimed in claim 1, further comprising:
    a holding unit configured to hold the optical member, wherein the elastic supporting member is configured to indirectly support the optical member so as to facilitate the oscillation of the optical member by supporting the holding unit.

3. An image pickup apparatus as claimed in claim 2, wherein the piezoelectric element is provided between the holding unit and the optical member.

4. An image pickup apparatus as claimed in claim 1, wherein the piezoelectric element is a multilayer piezoelectric element.

5. An image pickup apparatus as claimed in claim 1, wherein the optical member is an optical low-pass filter.

6. An image pickup apparatus as claimed in claim 1, wherein the optical member is an infrared cut filter.

7. An image pickup apparatus as claimed in claim 1, wherein the elastic supporting member supports the optical member in a first direction to which the vibration by the piezoelectric element is provided and in a second direction perpendicular to the direction to which the vibration by the piezoelectric element is provided, the elastic supporting member having smaller stiffness in the first direction than the stiffness in the second direction.

8. An image pickup apparatus comprising:
    an image pickup element configured to convert an optical image of a subject into an electric signal;
    an optical member configured to modulate an incident light beam into a predetermined light beam and output the predetermined light beam, the optical member having a substantially rectangular shape and being disposed in front of the image pickup element along an optical axis for image taking;
    a piezoelectric element configured to contact a surface perpendicular to a light incident surface of the optical member and provide vibration to the optical member in a direction substantially perpendicular to the optical axis for image taking, wherein the vibrating surface of the piezoelectric element is not bonded to the surface perpendicular to the light incident surface of the optical member;

an elastic supporting member configured to support the optical member in a floating state so as to facilitate the oscillation of the optical member and to seal a space between the image pickup element and the optical member, the elastic supporting member being formed from a polymer and urges the surface of the optical member which faces the surface of the optical member which contacts to the piezoelectric element in the direction of the piezoelectric element even when the piezoelectric element is driven in the direction of contraction; and a control unit configured to control the vibration provided by the piezoelectric element.

* * * * *